United States Patent [19]

Kanapenas et al.

[11] Patent Number: 5,059,256

[45] Date of Patent: Oct. 22, 1991

[54] METHOD OF MANUFACTURING FILTERS BY LASER TREATMENT AND DEVICE THEREFOR

[76] Inventors: Rimantas-Mikolas V. Kanapenas, ulitsa Komunaru, 22, Kv. 6; Mindaugas J. Vaitkyavichjus, ulitsa Arkhitektu, 112, kv. 49; Jurgis K. Vischakas, ulitsa Shviturio, 3, kv. 35; Kyastutis J. Dumchjus, ulitsa Dzerzhinskogo, 160, kv. 335; Eduardas J. Bendoraitis, ulitsa Eishishkju plyantas, 26, kv. 26, all of Vilnjus, U.S.S.R.

[21] Appl. No.: 477,916

[22] PCT Filed: Sep. 1, 1988

[86] PCT No.: PCT/SU88/00176

§ 371 Date: May 8, 1990

§ 102(e) Date: May 8, 1990

[87] PCT Pub. No.: WO90/02628

PCT Pub. Date: Mar. 22, 1990

[51] Int. Cl.$^5$ .............................. B23K 26/12
[52] U.S. Cl. ..................... 148/9 C; 148/903; 219/121.67
[58] Field of Search .............. 148/9 R, 903, 9 C; 219/121.61, 121.67, 121.70; 266/48

[56] References Cited

U.S. PATENT DOCUMENTS 4,317,023 2/1982 Gryskiewicz .................. 219/121.67
4,891,077 1/1990 Roll et al. ............................ 148/9 R

FOREIGN PATENT DOCUMENTS 173654 7/1985 European Pat. Off. .
202791 9/1986 Japan .
255788 11/1986 Japan .
958060 12/1982 U.S.S.R. .

Primary Examiner—S. Kastler
Attorney, Agent, or Firm—Lilling and Lilling

[57] ABSTRACT

A method of manufacturing filters by laser treatment, wherein working is done by a laser beam and a jet of working gas. An absorbing coating is applied to a surface to be worked. The laser beam is focused to form a focal spot within a work piece at a depth $h_1$ from its surface with $$0.025 \leq h_1/h < 0.22$$

where h is the thickness of the work piece.

Abrasive particles are introduced in a pulsed periodic manner into said jet of working gas at the moment the variation amplitude of the volume of molten metal in a cutting cavity reaches a maximum value. A device for manufacturing filters has a laser, a nozzle with an optical laser focusing system, and a mechanism for controlling the yield of an absorbing coating.

8 Claims, 1 Drawing Sheet

METHOD OF MANUFACTURING FILTERS BY LASER TREATMENT AND DEVICE THEREFOR

BACKGROUND OF THE INVENTION

1. Field of the Invention

The present invention relates to laser treatment processes and facilities and, in particular, to a method of manufacturing filters by laser treatment and a device therefor. More specifically, it is concerned with manufacture of filters, which are designed for extracting water from deep wells, by laser cutting of metals by the use of a flow directed towards a treatment point in conjunction with laser beams.

2. Description of the Related Art

Various filter designs running to about a hundred are currently in use, for example, gauze, wire, perforated edge and other filters. Accordingly, there are numerous production techniques.

In most cases, however, the known production methods do not provide for simple and reliable construction and their efficiency is fairly low, that is, the water intake surface of filters includes several layers, more specifically, a perforated tubular frame, steel guides, and a gauze or wire layer.

In other water intake filters, the construction is simplified by incorporating narrow slots, that is, by providing a single-component arrangement. However, with stamping and rolling techniques, narrow Y-shaped slots are obtainable only where sheet steel is utilized, a disadvantage substantially limiting the use of such filters in deep-water wells which amount to more than 90% of all artesian wells.

The known methods do not, at present, allow utilizing steel pipes for fabricating water intake filters with narrow Y-shaped slots, which would possess adequate hydrodynamic characteristics.

Also known in the art is a method of manufacturing filters by laser treatment and a device therefor, said device comprising an installation for laser treatment of tubes (cf. JP, H, 60-223,692). The method includes such operations as laser cutting of tubes, heat treatment of their surfaces, and making of holes therein.

The known installation comprises mechanisms for attachment of tubes in a horizontal direction and for their displacement with a work table in the direction of the X coordinate; a mechanism designed to set a tube in rotation about its axis in two opposite directions; and an optical head directing a beam from a laser radiation source to a treatment point and focusing it to obtain a spot of a predetermined diameter in the area where laser treatment is to be carried out. Also, the installation incorporates means for moving the optical head both in a vertical direction and along the tube axis by means of a skew gearing arrangement.

An apparent disadvantage of the known method and the installation therefor is that the techniques involved do not permit obtaining taper slots since laser beam focusing resulting in a spot of predetermined diameter yields but a surface dimension of a hole without affecting a cross-sectional shape of a slot and quality of its walls. The power of laser radiation and the speed of movement of a tube being worked are dependent upon the capacity of the foregoing installation, the resultant limitations being associated with the need to satisfy stringent cutting requirements.

There is also known a device for manufacturing filters by laser treatment, which represents an automatic installation for gas-laser cutting of metals (SU, A, 958,060). The known installation comprises a continuous wave laser, a focusing lens, a nozzle for feeding working gas into a cutting area, and a work table with its drive mechanisms. The installation also includes a switching circuit and two pressure pickups, which are disposed under a cutting line. The first pickup is arranged at a distance equal to the radius of a focused laser beam from its axis in a direction opposite to the cutting direction, while the other pick-up is displaced relative to the first pickup in the same direction within a distance equal to the diameter of a jet of working gas coming out of a cutting cavity. The outputs of both pickups are connected through the switching circuit to the input of a mechanism controlling the work table drive speed and enabling manual and automatic control of a cutting speed. At optimum cutting speeds a part is completely cut through within a period of time at which a laser beam covers a distance equal to the diameter of a focused beam. The part being worked is cut through within a distance equal to the radius of the focused laser beam from its axis in a direction opposite to the cutting direction. The jet of working gas coming out of the cutting cavity passes between the pressure pickups getting into none of them. When cutting speeds are above or below an optimum value, the cutting is fully accomplished at a distance greater or, respectively, smaller than the radius of the focused laser beam. Consequently, the jet of working gas coming out of the cutting cavity deflects from its original position and gets into the first or second pressure pickup.

A major disadvantage of the foregoing automatic installation is that it does not include means for obtaining slots and cuts of desired shape. The use of pressure pickups as a means designed to check for optimum cutting conditions introduces unwanted complexities in the manufacture of filters by the use of the afore-mentioned installation, said limitation being associated with the need for cutting a plurality of slots and cuts around the periphery of a tube and throughout its length.

In a prior art method of manufacturing borehole filters by laser treatment (U.S. Pat. No. 4,317,023), fabrication of a filter with transverse slots involves focusing of a laser beam at a point lying somewhat higher than the outer surface of a plastic tube whereupon said tube is rotated about its longitudinal axis. A conical laser beam passing through the outer surface of the tube sublimates its material, thus forming an underlying internal slot whose walls diverge in the direction of the central axis of the tube.

The afore-mentioned method of manufacturing filters by laser cutting of dielectric materials is based on surface evaporation of a material without formation of a liquid phase. Due to the absence of heat conduction, all thermal energy is spent on evaporation of said material and, consequently, the profile of the formed slot follows the profile of the focused beam. The thickness of the material being cut is linearly dependent upon radiant thermal energy. Laser cutting of metals greatly differs from laser cutting of dielectric materials, as regards physical principles. When metals are to be cut, the presence of working gas, for example, oxygen or a suitable inert gas is necessary since the occurring process is characterized by exothermic reactions involving molten metal and working gas. In this case the cutting profile determines the heat-producing rate, which is dependent upon technological parameters of the working gas and laser beams whereby profiles may not be shaped as desired.

SUMMARY OF THE INVENTION

It is, therefore, an object of the present invention to provide a method of manufacturing filters by laser treatment and a device therefor, which would improve operational characteristics of the filter and form water-permeable Y-shaped slots diverging towards the filter interior by creating optimal conditions for laser radiation injection into the substance and laser control of radiation parameters; obtain high-quality cutting surfaces with simultaneous increase of filter production rate; simplify filter construction; save nonferrous metals; reduce the number of technological operations; reduce filter manufacturing cost; and widen the field of uses of manufactured filters due to possibility of variation within great limits of the width, arrangement and profile of slots thereof.

This object is attained by a method of manufacturing filters by laser treatment which according to the invention, comprises the steps of directing a laser beam and a jet of working gas onto the surface of a part being worked to form a cutting cavity, focusing said laser beam to obtain a focal spot within said part at a depth $h_1$ from its surface with $$0.025 \leq h_1/h < 0.22$$

where h is the thickness of the part.

The work part being suitably diplaced relative to the laser beam, and introducing abrasive particles in a pulsed periodic manner into said gas jet at the moment the variation amplitude of the volume of molten metal in the cutting cavity reaches a maximum value.

The method forming the subject of the present invention provides for manufacture of edge filters constructed so as to allow vigorous water intake without sanding in coarse and fine soils, that is, filters with conical slots whose walls diverge in the direction of the filter interior. The walls of the conical slots are smooth and fine, a hole radius being 10 to 15 microns. An advantage of the proposed method over the prior art is a higher cutting speed and, hence, an increased production rate.

It is of advantage that, before laser treatment, the surface of a part to be worked should be given an absorbing coat having a width equal to the diameter of a focal radiation spot and a thickness of 5 to 20 microns.

The application of said absorbing coating in the form of discrete narrow strips of varying thickness makes it possible to concentrate laser energy precisely at work points, a feature substantially increasing cutting efficiency.

The proposed filter production method involving application of an absorbing coating is preferably accomplished by the use of a device comprising a laser, a nozzle with an optical laser focusing system, a drive enabling linear and radial movement of a work piece, a nozzle for feeding working gas and abrasive particles into a work area, which is located in close proximity to said nozzle comprising the optical focusing system, and a mechanism for controlling the yield of an absorbing surface, said mechanism being secured to said nozzle comprising the optical focusing system in a manner allowing its rotation about the axis of said nozzle and installation thereof during a cutting process so that the center of a capillary outlet of said mechanism is found in the same plane with the optical axis of said laser focusing system.

The proposed device makes it possible to accomplish the method for manufacturing filters according to the invention. The construction of the device substantially increases a filter production rate and improves operational characteristics.

Advantageously the proposed device comprises a polyphase oscillator. It is also of advantage that said mechanism used to control the yield of an absorbing coating and designed for applying, in a substantially discrete and uniform manner, a coating of required width and thickness should be made as a cylindrical reservoir with a stack of rigidly interconnected piezoceramic washers, each of which is placed in series with the output of said polyphase oscillator.

BRIEF DESCRIPTION OF THE DRAWINGS

The above described objects, together with other objects and features of the invention, will become more readily apparent from the following detailed description taken in conjunction with the accompanying drawings, wherein.

DESCRIPTION OF THE PREFERRED EMBODIMENT

Figure 1:
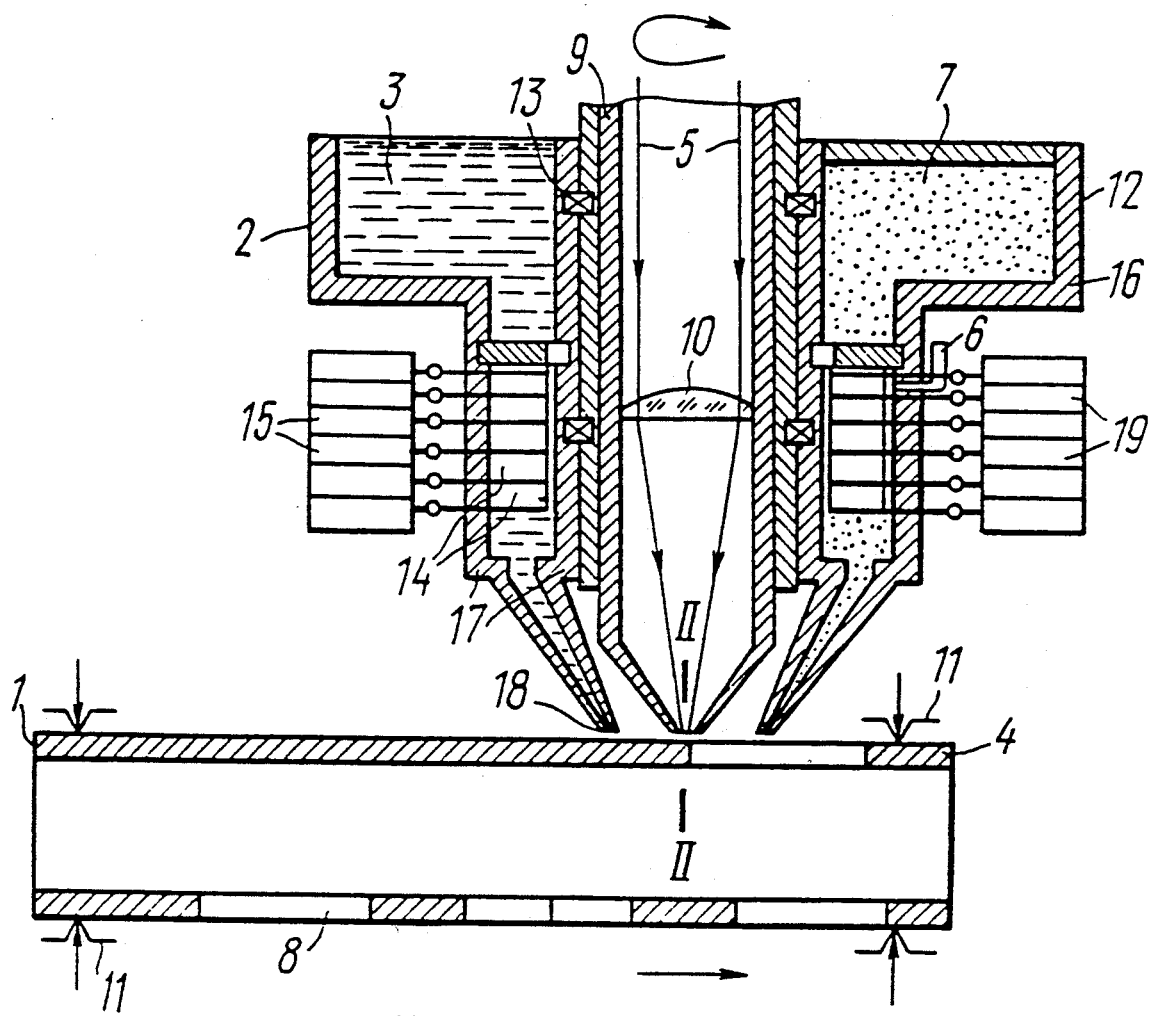
FIG. 1 shows diagrammatically a device for accomplishing a method for manufacturing filters by laser treatment according to the present invention.
Figure 2:
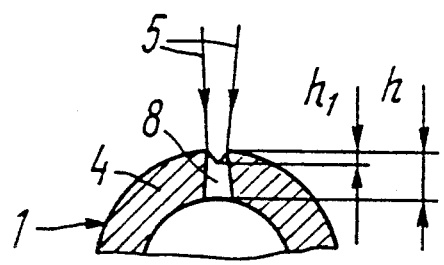
FIG. 2 is a cross-sectional view of the same taken along line II—II of FIG. 1, according to the invention.

The method of manufacturing filters by laser treatment is accomplished as follows. Work pieces are metal tubes made of steel of various grades (tube diameter: 78 to 380 mm; wall thickness: 3 to 9 mm). As a tube 1 (FIG. 1) moves along its geometrical axis at a speed of 1.1 m/min, a mechanism 2 for controlling the yield of an absorbing surface is turned on, said mechanism being comprised in the device for manufacturing filters by laser treatment in compliance with the invention. The width of the coating conforming to a focused laser spot on the surface is within 0.2–0.5 mm, the desired width being provided by the mechanism 2. A coating 3 is made 10 to 15 mm long, a corresponding spacing being 10 cm. A continuous wave $CO_2$ laser having an average radiating power of 1 kW is preferably used in treatment operations. A laser beam is focused within a thickness h (FIG. 2) of a wall 4 of the tube 1 at a depth $h_1$, corresponding values being chosen from inequality $0.025 \leq h_1/h < 0.22$. Concurrently with the effect of laser radiation 5, a jet of working gas is fed into a cutting area through an inlet 6 (FIG. 1) in a pulsed periodic manner under a pressure of 0.2 to 0.5 MPa. Said jet of working gas contains irregular acute-angled abrasive silicon carbide particles 7, an average diameter thereof being 80 to 100 microns at a density of 3.2. The rate of flow of the abrasive particles 7 is 0.2 kg/min. The location of the focal plane at the distance $h_1$ from its position on the surface under treatment results in reverse conicity of through holes 8 (FIG. 2) since the jet of compressed gas containing the abrasive dust 7 and fed radially in a concentric manner relative to the laser beam is actively involved in such processes as melting, combustion and removal of metal in the vicinity of the focal plane, that is, in the area characterized by maximum intensity of the laser radiation 5. With such an arrangement of the focal plane, slots 8 (FIG. 2) are formed in the walls 4 of the work piece, said slots being characterized by reverse conicity and a minimum roll, a feature affording a high cutting quality and increasing a production rate due to omission of a subsequent scraping operation.

The abrasive dust 7 is introduced into the jet of working gas taking into account the fact that gas-laser cutting of metals by the use of continuous wave laser radiation involves intensive localized heating of an area of the part being cut, phase transitions within the material, and removal of waste products by said jet of working gas. The transfer and removal of a molten mass of metal and its oxides formed in the cutting cavity are carried out primarily under the action of a pressure gradient and a tangential friction stress of the gas flow and, to a lesser extent, due to gravitational forces. The following zones are formed under the action of laser radiation and oxygen: a liquid phase comprising molten metal oxides, the molten metal itself, and base metal.

One of the necessary conditions for ensuring a continuous cutting process, say in oxygen cutting, is provision of equal amounts of melt formed on the cutting surface and removed therefrom. Characteristically, a molten mass is formed and removed periodically due to physicochemical and mechanical gas processes occurring in the cutting cavity, characteristics of laser radiation and a gas jet, and cutting conditions. In the course of cutting over a time period $t_1$, a molten layer is formed on the cutting surface and built up to a maximum value whereupon, during a time period $t_2$, the molten mass is removed under the action of the gas jet and the thickness of the liquid layer is reduced to a minimum value. A complete cycle including formation and removal of the molten layer is continuously repeated, the repetition period being $T = t_1 + t_2$. The principal parameters characterizing the length of time $t_1$ are intensity of metal heating by laser radiation and heat release in metal oxidation, while the length of time $t_2$ is essentially characterized by a pressure gradient and kinetic energy of said gas jet. When the time $t_2$ at which the molten layer is removed exceeds the time $t_1$ at which it is formed, the height of irregularities increases and the cutting line is, accordingly, curved. Conversely, if the time $t_1$ at which the liquid layer is formed exceeds the time $t_2$ at which it is removed, the cutting process will not be continuous.

In cutting by the use of an oxygen jet, the governing factor is the metal oxidation rate which is, in most instances, limited by diffusion of the component in the direction of the reaction front through a layer of oxides formed. Abrasive particles are introduced into said oxygen jet in a pulsed manner with the repetition period T at the instant when the volume of the molten layer is maximum.

The abrasive action of solid particles increases the speed at which the molten layer is removed. Also, the abrasive particles basically facilitate disintegration and removal from the cutting cavity of an oxide film formed on the surface of the molten layer, thereby providing supply of oxygen directly to molten base metal, an advantage increasing the metal oxidation rate and, accordingly, the power of a secondary (chemical) heat source.

The condition $t_1 \approx t_2$ is satisfied by choosing an appropriate duration of the process of introducing said particles into the oxygen jet. Thus, the molten layer becomes smaller, quality of the cut surface is substantially improved, and a maximum cutting speed is increased considerably.

With said oxygen jet, a cutting process will be normal when the melting point of oxides formed is below the melting point of base metal, another necessary condition being the presence of fairly fluid molten oxides.

In cutting of high-alloy, corrosion-resistant and like steels and also non-ferrous metals in an oxidized medium, an oxide film is formed on the surface of the molten layer, the melting point of said film being above the melting point of the base metal. Changing the oxide film to a liquid (molten) state is a power-consuming operation. Therefore, such metals are generally cut by the use of a suitable inert or neutral gas.

When the afore-mentioned metals are cut by an oxygen jet, the high-melting oxide film is destroyed by abrasive solid particles and a gas flow. Due to heat liberated in an exothermic metal-oxidation reaction, the cutting speed in the given case substantially exceeds that attained in cutting by the use of a neutral gas with power characteristics of laser radiation being essentially unchanged.

The device for manufacturing filters by laser cutting in compliance with the invention comprises a laser (not shown in the drawing), a nozzle 9 (FIG. 1) with an optical system 10 for focusing the laser radiation 5, a drive 11 enabling linear and radial movement of a work piece, and a nozzle 12 for feeding working gas and the abrasive particles 7, the latter nozzle being secured to the body of the nozzle 9 by means of bearings 13 in a manner allowing its rotation. The mechanism 2 for controlling the yield of the absorbing coating 3 represents a cylindrical reservoir 16 with a stack of rigidly interconnected piezoceramic washers 14, each of which is placed in series with a respective output of a polyphase oscillator 15. Constructed in a similar manner is the nozzle 12 for feeding working gas and the abrasive particles 7, the inlet 6 used to feed the working gas being provided in the cylindrical reservoir 16. When the polyphase oscillator 15 is turned on, a voltage of 40 to 50 V is applied in phase to the piezoceramic washers 14. Each ceramic washer 14 in the stack is connected to each adjacent washer 14 with a positive terminal to the "+" side and a negative terminal to the "−" side. Besides, each ceramic washer 14 is placed in series with the output of the polyphase oscillator 15. On application of AC voltage, a travelling wave is generated by the stack of the washers 14. With a small gap of 0.05 to 0.2 mm provided between the washers 14 and the inner surface of the cylindrical portion of the reservoir, the generated travelling wave causes the absorbing coating 3 to move out through a hole in said reservoir. With a difference in fluid pressure in the reservoir and in its cylindrical portion, the pressure in a feed tube 17 increases and the coating 3 is applied in a thin jet (0.2 to 0.5 mm in width) through a capillary outlet 18 to the surface of the tube 1 being worked. As the tube 1 moves, strips of the absorbing coating 3 are applied to its surface along the geometrical axis thereof.

The coating 3 absorbing, for example, continuous wave radiation from a $CO_2$ laser may be liquid gouache, carbon black, calcium phosphate and the like. The outlet 18 is made as a capillary opening so that, in laser cutting of the tube 1 to obtain the slots 8 (FIG. 2), the application of the absorbing coating 3 may be stopped by deenergizing the piezoceramic washers 14 (FIG. 1) since the cutting of the slots 8 (FIG. 2) has to be discrete, for example, with a spacing of 10 cm.

In the deenergized state, no pressure is built up in the cylindrical portion of the reservoir and the liquid absorbing coating 3 (FIG. 1) is not applied to the surface of the tube 1 due to the action of capillary forces in the outlet 18. The slots 8 (FIG. 2) are disposed on one cutting line along the geometrical axis of the tube 1, while the cutting lines placed around the periphery thereof are displaced, say through 10° to 25°. Therefore, the absorbing coating 3 must be applied to the surface of the tube 1 in a discrete manner, that is, coats must be given only to sites subjected to the laser radiation 5.

A special mechanism is used to move the tube 1 along its geometrical axis and around the circumference. To generate a travelling wave in the piezoceramic washers 14, the oscillator 15 comprises phase converters built in said oscillator. The amplitude of mechanical oscillations of the piezoceramic washers 14 is varied by changing the voltage values. Thus, the yield of the absorbing coating 3 may be continuously controlled by changing the thickness and width of the applied coating as required.

The pulsed periodic feed of the abrasive dust 7 with the working gas is controlled via a polyphase oscillator 19.

The herein disclosed method and device realizing this method can be used to manufacture filters for water production from deep wells by means of a metal cutting laser method employing a flow directed towards a treatment point in conjunction with the laser beam.

Filters manufactured according to the invention may be advantageously used in drawing water through infiltration or from artesian wells, as well as in analyzing underground water by the use of observation holes. Water intake filters fabricated by the proposed method may be used both in coarse and fine water-bearing layers at different depths.

Moreover, the present invention may be used to advantage in manufacture of filters for drainage, distribution, heating and power systems, oil and gas wells, other applications thereof being chemical and mechanical purification of water and overground watering.

We claim:

1. A method of manufacturing filters by laser treatment, comprising the steps of:
   directing a laser beam and a gas jet to a work surface of a work piece, thereby forming a cutting cavity;
   focusing the laser beam to form a focal point within the work piece at a depth $h_1$ from the work surface, $h_1$ being selected to satisfy an equation as follows:

$$0.025 \leq h_1/h < 0.22$$

h being a thickness of the work piece relative to the laser beam; and
   periodically introducing pulses of working substance into the gas jet when a volume of molten material in the cutting cavity reaches a maximum value.

2. A method of manufacturing filters according to claim 1, wherein the working substance is an abrasive powder.

3. A method according to claim 1, further comprising the step of applying an absorbing coating to the work surface of the work piece prior to cutting, the coating having a width equal to a diameter of a focal radiation spot, and a thickness of 5–20 microns.

4. A method for manufacturing filters by laser treatment, comprising the steps of:
   directing a focused laser beam and a gas jet to a work surface of a work piece to form a cutting zone;
   introducing a working substance into the jet in a pulsed periodic manner according to a first equation as follows:

$$t_1 = t_2,$$

where $t_1$ is a time of maximum accumulation of molten material, and $t_2$ is a time of diminishing accumulation of molten material to a minimum, a period T of a pulse of the working substance being governed by a second equation as follows:

$$T = t_1 + t_2.$$

5. A method for manufacturing filters according to claim 4, wherein the working substance is an abrasive powder.

6. A method for manufacturing filters according to claim 4, further comprising the step of applying an absorbing coating to the work surface of the work piece prior to cutting, the coating having a width equal to a diameter of a focal radiation spot, and a thickness of 5–20 microns.

7. A device for manufacturing filters by laser treatment, comprising: a laser, a first nozzle with an optical laser focusing system, a drive enabling linear and radial movement of a work piece, a second nozzle for feeding working gas and abrasive particles into a work area arranged in close proximity to said first nozzle, means for controlling yield of absorbing coating, secured to said first nozzle in a manner allowing rotation about an axis of said first nozzle and installation thereof during cutting so that a center of a capillary outlet of said means is found in a plane with an optical axis of said optical laser focusing system.

8. A device according to claim 7, further comprising a polyphase oscillator, said means for controlling yield of absorbing coating comprising a cylindrical reservoir and a stack of rigidly interconnected piezoceramic washers, each washer being placed in series with an output of said polyphase oscillator.

* * * * *